United States Patent [19]  
Klauminzer et al.

[11] Patent Number: 4,611,270  
[45] Date of Patent: Sep. 9, 1986

[54] METHOD AND MEANS OF CONTROLLING THE OUTPUT OF A PULSED LASER

[75] Inventors: Gary K. Klauminzer; S. Spencer Merz, both of Lexington; James D. Campbell, Bedford, all of Mass.

[73] Assignee: Questek Incorporated, Billerica, Mass.

[21] Appl. No.: 532,786

[22] Filed: Sep. 16, 1983

[51] Int. Cl.$^4$ .............................................. H01S 3/13
[52] U.S. Cl. ...................................... 364/183; 372/30
[58] Field of Search ............................ 372/29, 30, 31; 364/183, 733, 734, 486

[56] References Cited

U.S. PATENT DOCUMENTS

| | | | |
|---|---|---|---|
| 3,710,082 | 1/1973 | Sloane et al. | 364/183 X |
| 3,786,491 | 1/1974 | Carleton | 364/734 X |
| 3,898,583 | 8/1975 | Shuey | 372/29 |
| 3,936,663 | 2/1976 | Taylor | 364/734 |
| 4,023,019 | 5/1977 | Leibowitz et al. | 364/733 |
| 4,054,786 | 10/1977 | Vincent | 364/734 X |
| 4,086,656 | 4/1978 | Brown | 364/733 |
| 4,137,568 | 1/1979 | Dlugos | 364/734 |
| 4,166,985 | 9/1979 | White et al. | 372/30 |
| 4,246,642 | 1/1981 | Magill | 364/733 |
| 4,314,343 | 2/1982 | Tomlinson | 364/733 X |
| 4,344,172 | 9/1982 | Busse | 372/29 |

OTHER PUBLICATIONS

Stabilization of the Radiation Power of a Continuous $CO_2$ Laser; Soviet Journal of Optical Technology; Zelenov et al.; vol. 42, No. 6, pp. 355–356; Jun. 1975; American Institute of Physics, N.Y., N.Y.

Primary Examiner—Jerry Smith  
Assistant Examiner—Allen MacDonald  
Attorney, Agent, or Firm—Robert T. Dunn

[57] ABSTRACT

In a pulsed laser which is periodically energized so that it emits a pulse of radiation following each periodic energization, a feedback loop control system is provided for controlling energization of the laser so that the laser output radiation pulses are substantially constant over a relatively long period of operation, the feedback loop including a detector for detecting the laser pulses and producing an electrical signal representative of each pulse and a comparing circuit responsive to those electrical signals and a reference signal that represents the constant laser output level desired, for comparing the electric signals and the reference signals producing a control signal for controlling the energy of the periodic energization.

20 Claims, 4 Drawing Figures

METHOD AND MEANS OF CONTROLLING THE OUTPUT OF A PULSED LASER

BACKGROUND OF THE INVENTION

This invention relates to feedback loop control systems for lasers and more particularly to a feedback loop control system subject to a reference level control signal for controlling the periodic energization of a pulsed laser.

Pulsed lasers of all sorts, whether the laser medium is solid, liquid or gas, are subject to output fluctuations. There are short-term fluctuations which are small pulse to pulse variations in the peak output power and/or output pulse energy caused by small variations in stored energy, optical perturbations and others. There are also long-term fluctuations which are gradual changes in the average output energy (the average energy of each successive output pulse from the laser) caused by a number of factors including the following:
a. heating of the laser medium,
b. heating and wear of electrical components,
c. misalignment of the optical cavity,
d. contamination of the optics,
e. formation of absorbing or scattering species in the medium which affect the laser gain, and
f. in a gas laser, consumption of the fuel gas.

Usually the long-term output of the laser declines with time, but it may also increase. For example, a gas laser may be filled with too much of one gas component and so the output of the laser would increase as that component is consumed and its concentration moves toward an optimum value (everything else being constant).

In some pulsed gas lasers, the gaseous medium flows through the optical cavity and this reduces the long-term degradation. This technique is typical with $N_2$ and $CO_2$ gas lasers. However, even for those gas lasers, the long-term gradual change in output pulse energy is not eliminated, it is only reduced.

The repetition rate of an "excimer" or rare gas halide laser is limited. In a static gas system, the same gas volume cannot be excited repeatedly and produce output radiation pulses of the same energy, unless the gas is allowed to return to the initial state between excitations which takes on the order of a second and so the pulse rate for successive equal pulses is limited to about one pulse per second. This limitation of an excimer laser can be overcome with a dynamic gas system where the gas flows through the excited area. Empirically, the gas volume must be exchanged two to four times between excitations to produce equal output pulses. Hence, it has been the practice with dynamic excimer lasers to flow the gas through the discharge area at rates of several liters per second. By doing this, higher repetition rates can be achieved.

The repetition rate of a gas laser, as explained above, is limited and empirical guidelines are available that relate repetition rate to gas flow rate through the active region of the laser. Theoretically, the gas molecules disassociate into their atoms following lasing and then are re-excited to form the parent molecules and so the process is completely reversible and a single gas fill should be usable for an unlimited number of discharges. In practice, however, there are molecular impurities in the gas that adversely affect the laser emission. Also, particles of material sputter off of the electrodes and scatter light and contaminate the optical windows. In addition, the fuel gas reacts and so is no longer available for excitation. All of these factors contribute to the relatively long-term degradation in the energy of the laser output pulses. A measure of this for a given laser system is the number of output pulses up to the point at which the energy of a pulse has fallen to fifty percent of the initial value. This is called the gas lifetime.

Clearly, for any gas laser the long-term degradation of the energy of the laser output pulses can be alleviated somewhat by flowing the gas through the active region from a relatively large gas reservoir and by removing impurities. However, for some gas lasers an unsealed or flowing or dynamic gas system is not practical and a sealed gas system is required, The reasons for this range from cost and size limitations to the excessively corrosive quality of the gas. And so for such lasers there is a need to provide a method and means of controlling the laser so that the energy of the output pulses remains substantially constant over the useful operating period (the lifetime of one gas fill).

SUMMARY OF THE INVENTION

This long-term degradation of output pulse energy exhibited by all types of pulsed lasers is, in a generic sense, due to a degradation of the laser gain and so it is an object of the present invention to provide a technique that overcomes or compensates for the degradation of gain so that the laser output pulses are steady over the relatively long-term period of operation. This is achieved using a feedback loop that includes a laser pulse detector system producing electrical signals that represent the laser output pulses and means responsive thereto for comparing those signals with a reference and controlling the laser, depending on the comparison.

It is a more specific object to provide a method and apparatus for controlling a pulsed gas laser so that the gradual long-term changes in the energy of the laser output pulses, attributed to the factors described hereinabove and to others not specifically mentioned herein, are reduced or at least diminished.

It is another more specific object to provide a method and apparatus for controlling a pulsed rare gas halide (excimer) laser so that the gradual relatively long-term changes in the energy of the laser output pulses described hereinabove are reduced.

In accordance with a specific embodiment of the present invention described herein, a feedback loop control system is provided for controlling energization of a pulsed excimer laser so that the laser output pulses are substantially steady o ver the relatively long-term period of operation, the feedback loop including a detector for detecting the individual laser pulses and producing an electrical signal representative of each pulse and means responsive to those electrical signals and a reference signal that represents the constant output level desired for comparing the electric signals and the reference signals producing a control signal for controlling the energizing voltage.

DESCRIPTION OF EMBODIMENTS

For gas lasers that use a sealed gas system, as mentioned above, the gas lifetime of a single gas fill is by definition the number of pulses produced until the decline in output pulse energy is 50% of the initial pulse. This gas lifetime is also referred to as the long-term operation of the system. Depending on the laser medium, the pulse rate and the power, the gas lifetime or the long-term operation may by anything from a few minutes to several hours. In any event this large decline in pulse output energy over the relatively long-term operation is undesirable and diminishes the usefulness of the laser for many purposes.

Figure 1:
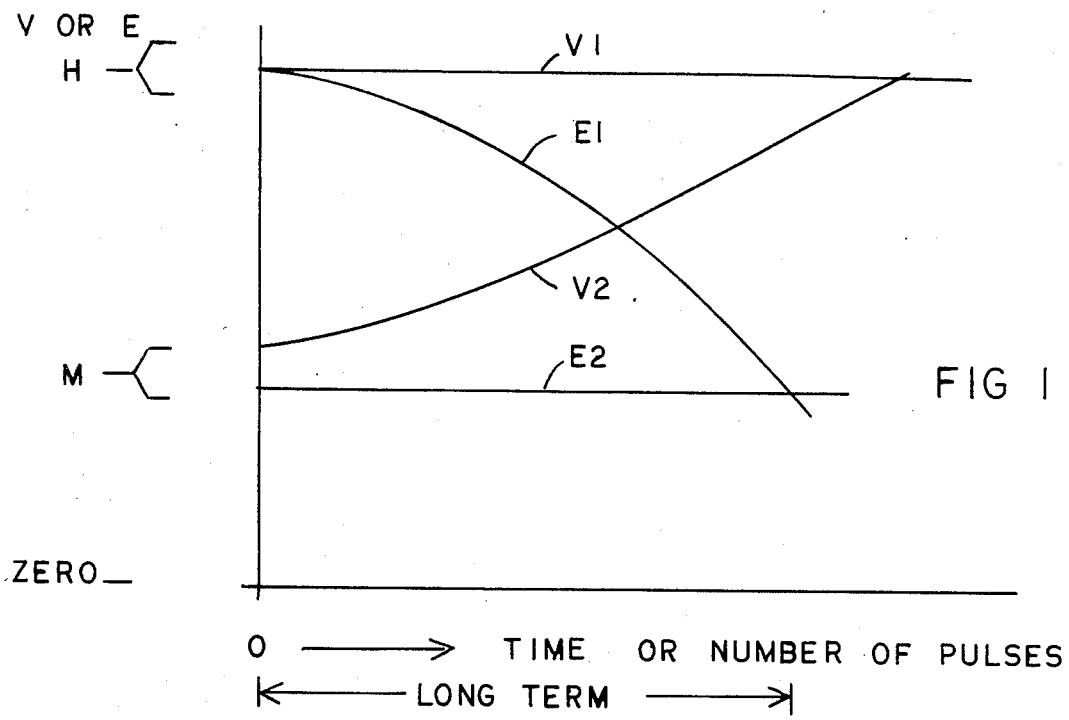
FIG. 1 is a plot of laser output pulse Energy and gas laser electric discharge energization Voltage, versus time or number of output pulses, which illustrates the long-term gradual changes in output energy of a pulsed laser that gives rise to the present invention and illustrates the effectiveness of the method and apparatus of the present invention for solving the problem.

FIG. 1 is a plot showing average laser output pulse energy (E) versus time or number of pulses and the accompanying high voltage (V) of the electric discharge that produces the output pulses of energy E over the same time. The V and E are shown as high and medium (H and M). Consider, for example, that these curves represent the operation of a typical excimer laser. The curves $V_1$ and $E_1$ at time zero are both high. That is, the energizing electric discharge voltage is maintained high at a constant $V_1$ throughout the long-term interval of operation. However, the average energy of pulses from the laser, $E_1$, begins high and gradually decreases so that at the end of the long-term the energy has declined to half of what it was at the beginning. Clearly, the constant V operation is accompanied by a degradation of the energy of the pulses over the long-term whether the starting conditions are high or medium (or even low). An object of the present invention is to provide a method and means that overcomes this gradual decline of the energy of the pulses from an excimer gas laser over the long-term operation.

In accordance with the present invention, the energizing voltage $V_2$ begins at, for example, a medium level and so the average energy $E_2$ of the laser pulses begins at a medium level. Then, over the long-term, the energizing voltage $V_2$ is gradually increased so that it may be at a high level near the end of the term, but the energy $E_2$ of the laser pulses will remain constant at the medium level throughout the long-term and so the desired result is achieved.

Figure 2:
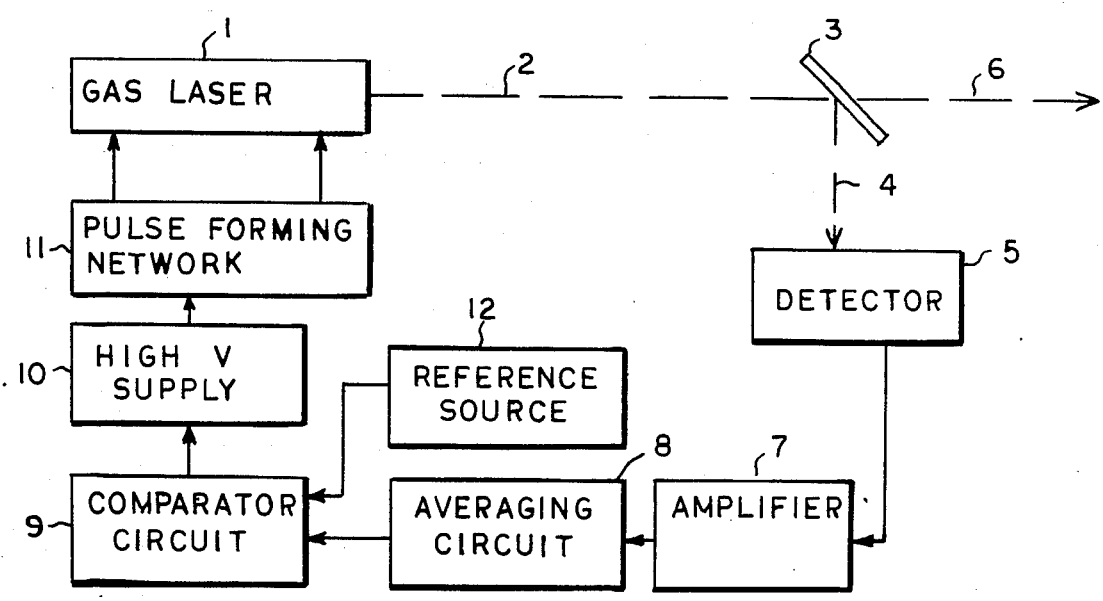
FIG. 2 is an optical and electrical block diagram of a pulsed gas laser system incorporating some essential features of the present invention for controlling the energization of the laser so that the average output pulse energy is relatively steady over long-term operation.

FIG. 2 illustrates an application of this concept for producing constant laser pulses over the long-term in a typical pulsed gas laser system. The gas laser, denoted 1, produces output pulses along optical line 2 which are sampled by intercepting the pulses with a beam sampler, such as a beam splitting mirror that reflects a small portion of the pulse energy along optical path 4 to a photodetector 5, while the greater portion of the pulse energy propagates along optical path 6 as the useful output beam of the laser.

The laser output can be sampled other ways. For example, the laser optical cavity mirror opposing the cavity output mirror can be partially transmissive and so produce the sample representative of the output.

The detector 5, in response to the impinging light pulses, produces electric pulses that may be direct analogs of the light pulses and are amplified by amplifier 7 and accumulated by averaging circuit 8. The operation of the detector, amplifier and averaging circuit is such that the output of the averaging circuit is a signal level which is essentially proportional to the average energy of a predetermined number of pulses that impinge upon the detector. For example, if the pulse rate of the laser is relatively high, say on the order of 200 to 1000 per second, the number of pulses that are averaged may be 100 or more. On the other hand, if the pulse rate is less than 200 per second, the number of pulses averaged may be less than 100. For some applications, it may be preferred that signal level output from the averaging circuit at any given time represents several seconds of operation.

The average signal level from 8 is compared with a reference signal level from source 12 by comparator circuit 9 which produces a difference signal that is fed to the high voltage supply 10, causing an increment in the high voltage V from the supply and so the voltage from the supply to the pulse forming network 11 is incremented as necessary to overcome the difference between the average signal level from 8 and the reference. In some cases, the reference signal level may be selected at the beginning of the long-term operational as equal to the initial average level from circuit 8 and so initially, the difference output from the comparator circuit is zero.

Figure 3:
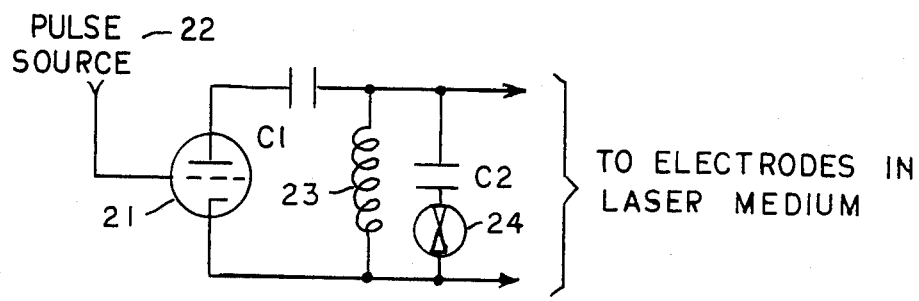
FIG. 3 is an electrical diagram of a suitable pulse forming network for use in the system shown in FIG. 2 where the laser gas medium is energized by an electric discharge driven by the pulse forming network.

A suitable pulse forming network 11 is illustrated in Figure 3. It includes a switching triode 21 that conducts when it is triggered by pulses from a source 22, charging capacitor $C_1$ through inductance 23, the charging energy E being expressed by:

$$E = \tfrac{1}{2} C_1 \times V^2.$$

The charge on $C_1$ is transferred to $C_2$ which connects to discharge electrodes in the gaseous laser medium through the pre-ionization source 24 which illuminates the gas just prior to the discharge of $C_2$ through the gas. The purpose of pre-ionization is to produce sufficient ionization in the gas so that it will conduct and discharge $C_2$ at the voltage V. When $C_2$ discharges, the energy stored is delivered to the gas. Clearly this network is but one suitable network that is charged by high voltage from a supply for energizing the gas laser medium.

Figure 4:
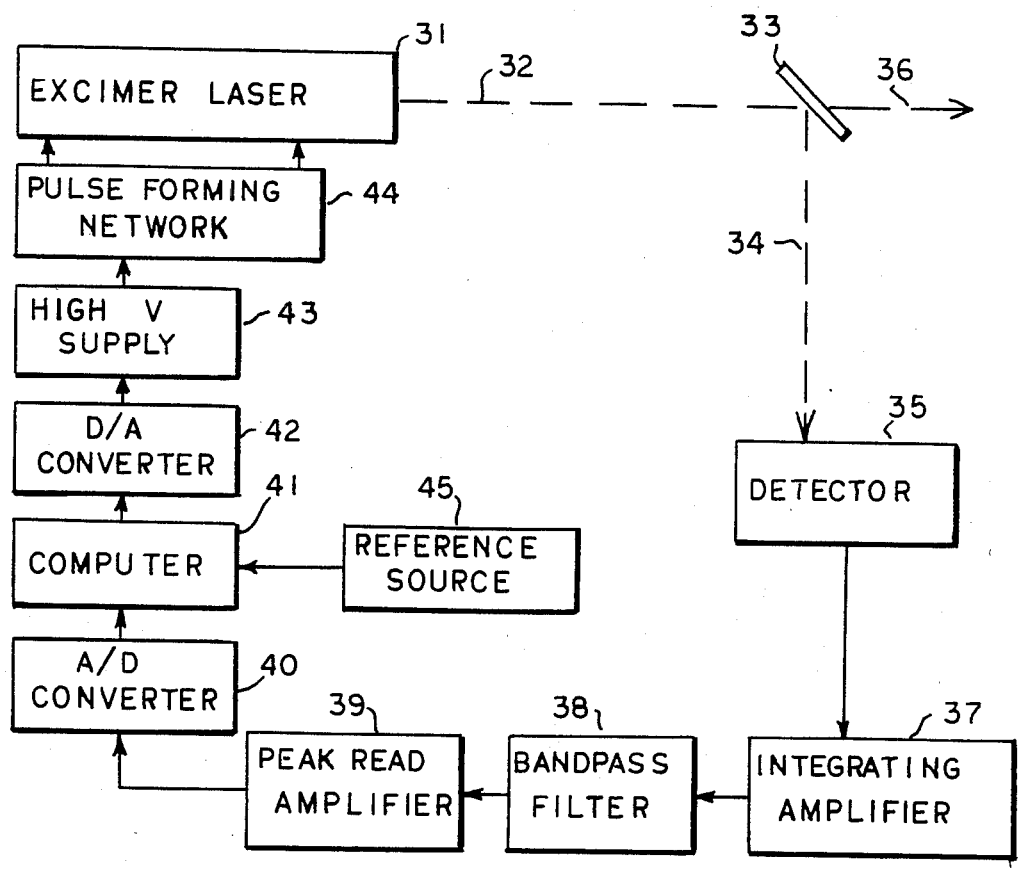
FIG. 4 is an optical and electrical block diagram of an excimer gas laser system including a feedback loop to the pulse forming network that drives the electric discharge that energizes the gas medium, showing the feedback signal forming circuits and a digital computer for controlling the high voltage supply to the pulse forming network so that the average energy of the laser pulses is relatively constant over the long-term operation.

Another feedback loop control system that incorporates features of the present invention and is particularly suitable for controlling an excimer laser or an $N_2$ of $CO_2$ laser, is illustrated in FIG. 4. Commercially available excimer lasers include XeCl, KrCl, ArF, KrF and XeF. Of these, XeCl exhibits the longest gas lifetime. The system illustrated in FIG. 4 has application to all of these excimer lasers. The excimer gas laser 31 produces output pulses along optical path 32 which are intercepted by a beam splitting mirror 33 that reflects a portion of the energy of these pulses along path 34 to a suitable detector 35, (such as a pyroelectric detector), while the useful laser output is transmitted through themirror along path 36. Typically, the optical pulse output from the laser is only 10 to 40 nanoseconds duration and so the detector should have a broad band frequency response so that the electric pulses produced by the detector are representative of the energy or the peak power of the light pulses.

Where each electric pulse is representative of the energy of the corresponding laser light pulse, the electric pulse is integrated by integrating amplifier 37, the interval of integration being about 1000 times the initial light pulse duration, and so in this case the pulse is integrated over about 10 microseconds, producing a peak amplitude signal at the end of the 10 microsecond interval that is proportional to the energy of the laser pulse. This peak energy signal is then filtered to eliminate high frequency components and for this purpose a band pass amplifier 38 is provided producing a pulse about half as long (5 microseconds) that has a zero slope peak of magnitude proportional to the energy of the laser pulse. Next, a peak reading amplifier 39 lengthens the peak into a plateau (a signal level) which is proportional to the energy of the laser pulse and is of sufficient duration that it can be readily converted to a digital number by a conventional analog to digital (A/D) converter. For this purpose, A/D converter 40 is provided that converts the level to a digital number and that number, referred to herein as the laser pulse energy number, is fed to computer 41. The computer stores the successive laser pulse energy numbers, periodically computes an average value of those numbers and then compares the average with a reference number from source 45, producing in the computer output a number representing the difference. That difference number is converted to an analog signal by a digital to analog (D/A) converter 42 and fed to the high voltage supply 43 where it increments the high voltage V that charges the pulse forming network 44. The pulse forming network 44 may be essentially the same as shown in FIG. 3.

On the other hand, where each electric pulse from the detector is representative of the peak power of the corresponding laser light pulse, the electric signal processing converts the electric pulse to a suitable form for converting with an A/D converter to to digital number that represents the laser pulse peak power, called the laser pulse peak power number. Those numbers are stored and averaged periodically and the average compared with a reference number, producing a difference that controls the high voltage to maintain the peak power of the laser pulses steady.

As mentioned above, an object of the present invention is to compensate for gradual changes in average output energy of a laser over the laser long-term period of operation. To do this, the energies of successive pulses are averaged over a sufficiently long interval that the variation of average energy is substantially less than the variation of energy from pulse to pulse. The effect of this is illustrated by the following example: consider that a short-term fluctuation might be ±5% peak to peak. However, if this is averaged over 100 pulses the average value will have fluctuations of only ±0.5% and so the advantage of averaging is demonstrated.

Features of the present invention can be applied effectively in a pulsed laser feedback loop system to maintain uniform output pulses over the long-term. The digital computing techniques can be used as described in FIG. 4 to provide a control loop that is hybrid, inasmuch as some of the loop signalling is digital and some is analog, or the system could be all analog. All of these and other variations and combinations of features of the present invention can be implemented in a given system for utilization without deviating from the spirit and scope of the invention as set forth in the appended claims.

What is claimed is;

1. A feedback loop control system for controlling energization of a pulsed laser so that desired laser output radiation pulses of substantially constant energy are produced over the relatively long-term operation of the laser comprising,
    (a) a pulsed laser,
    (b) means for periodically energizing said laser so that said laser emits a pulse of radiation following each periodic energization,
    (c) means for detecting said laser pulses, and producing corresponding electric signals, each of which is representative of the energy of its corresponding laser pulse,
    (d) means for producing a reference signal representative of said desired constant energy laser output pulses,
    (e) means responsive to said corresponding electric signals and said reference signal for comparing said corresponding electric signals with said reference signal, producing an output control signal, and
    (f) means responsive to said output control signal for controlling said laser energizing means.

2. A system as in claim 1 wherein said meams (c) for detecting said laser pulses and producing corresponding electric signals each of which is representative of the energy of its corresponding laser pulse, includes:
    (c1) means for integrating each of said coresponding electric signals producing a peak signal of which the peak magnitude is representative of the energy of the corresponding laser pulse,
    (c2) means responsive to said peak signal for producing a signal level representative of said peak signal magnitude which is representative of the energy of the corresponding laser pulse,
and said comparing means (e) compares said signal level with said reference signal.

3. A system as in claim 1 wherein, said laser is a gas laser, said means (b) for periodically energizing said laser includes high voltage electric discharge means and said means (f) for controlling said energizing means includes means for controlling the high voltage of the discharge.

4. A system as in claim 3 wherein, said means (c) for detecting said laser pulses produces an electric pulse that corresponds to each of said laser pulses and said electric pulse is input to:
    (c1) an integrator that produces a peak signal of magnitude representative of the energy of the corresponding laser pulse, and
    (c2) a peak reading amplifier that lengthens the peak of said integrated pulse in time producing a signal level of magnitude representative of the corresponding laser pulse energy,
and said pulse level signal is coupled to said comparing means (e) for comparing with said reference signal, which includes:

(e1) an analog to digital converter which produces a digital number representative of said electric signal level, (e2) a computer for storing successive of said digital numbers and computing the average of a multitude of such successive numbers, and said means (d) for producing a reference signal produces a digital reference number, and (e3) digital comparing means are provided for comparing said average number with said reference number producing a control digital number and said means (f) is responsive to said control digital number for controlling said laser energizing means.

5. A system as in claim 1 wherein, said means (c) for detecting said laser pulses and producing corresponding electric signals that corresponds to each of said laser pulses and includes means responsive to said corresponding electric signals for computing the average value of a multitude of said electrical pulses and said comparing means (e) compares said average value with said reference signal.

6. A system as in claim 1 wherein, said means (c) for detecting said laser pulses produces an electric pulse that corresponds to each of said laser pulses and said electric pulse is input to:

(c1) an integrator that produces a peak signal of magnitude representative of the energy of the corresponding laser pulse, and (c2) a peak reading amplifier that lengthens the peak of said integrated pulse in time producing a signal level of magnitude representative of the corresponding laser pulse energy, and said pulse level signal is coupled to said comparing means (e) for comparing with said reference signal.

7. A system as in claim 6 wherein, said means (c) for detecting said laser pulses produces an electric signal level representative of each laser pulse and said signal level is input to:

(e1) an analog to digital converter which produces a digital number representative of said electric signal level, (e2) a computer for storing successive of said digital numbers and computing the average of a multitude of such successive numbers, and said means (d) for producing a reference signal produces a digital reference number, and (e3) digital comparing means are provided for comparing said average number with said reference number producing a control digital number and said means (f) is responsive to said control digital number for controlling said laser energizing means.

8. A system as in claim 1 wherein, said means (c) for detectng said laser pulses produces an electric signal level representative of each laser pulse and said electric signal level is input to:

(e1) an analog to digital converter which produces a digital number representative of said signal level, (e2) a computer for storing successive of said digital numbers and computing the average of a multitude of such successive numbers, and said means (d) for producing a reference signal produces a digital reference number, and (e3) digital comparing means are provided for comparing said average number with said reference number producing a control digital number and said means (f) is responsive to said control digital number for controlling said laser energizing means.

9. A system as in claim 1 wherein, said means (c) for detecting said laser pulses produces an electric pulse signal that corresponds to each of said laser pulses and said electric pulse is input to:

(c1) an integrator that produces a peak signal of magnitude representative of the energy of the corresponding laser pulse, and (c2) a peak reading amplifier that lengthens the peak of said integrated pulse in time producing a signal level of magnitude representative of the corresponding laser pulse energy, and said pulse level signal is coupled to said comparing means (e) for comparing with said reference signal, which includes:

(e1) an analog to digital converter which produces a digital number representative of said electric signal level, (e2) a computer for storing successive of said digital numbers and computing the average of a multitude of such successive numbers, and said means (d) for producing a reference signal produces a digital reference number, and (e3) digital comparing means is provided for comparing said average number with said reference number producing a control digital number and said means (f) is responsive to said control digital number for controlling said laser energizing means.

10. A system as in claim 1 wherein, said laser is a gas laser, said means (b) for periodically energizing said laser includes high voltage electric discharge means and said means (f) for controlling said energizing means includes means for controlling the high voltage of the discharge.

11. In a pulsed laser system in which the laser medium is periodically energized so that the laser emits a pulse of radiation following each periodic energization, a method of controlling the operation of the laser so that over a relatively long-term period of operation of the laser the energy of the laser pulses are maintained at a desired level comprising the steps of:

(a) detecting said laser output pulses, (b) producing an electric pulse signal that corresponds to each laser output pulse and represents the energy of the output pulse, (c) producing a reference signal representative of said desired laser pulse energy level, (d) comparing said corresponding electric pulses with said reference signal, and (e) controlling the energization of said laser depending upon said comparison.

12. A method as in claim 11 wherein, between steps (a) and (b), the following steps occur:

(a1) producing successive electric pulse signals that each corresponds to one of the successive laser pulses, (a2) integrating each of said electric pulses, and (a3) detecting the peak of each integrated pulse and producing an equivalent electric signal level, (a4) said electric signal level being representative of the energy of the corresponding laser pulse.

13. A method as in claim 12 wherein, between steps (b) and (d) the following steps occur:

(b1) converting said corresponding electric pulse signal to a digital number which represents the energy of the corresponding laser pulse, (d1) storing successive values of said digital numbers, (d2) computing the average digital number for a multitude of said successive digital numbers, in step (d) the average digital number is compared with a digital number corresponding to the reference signal producing an output differential digital number, between steps (d) and (e), converting said output digital number to an equivalent analog signal and in step (e) said equivalent analog signal controls the energization of said laser.

14. A method as in claim 11 wherein laser is a gas laser that is energized by a high voltage electric discharge and the energy of each of said laser pulses depends on the voltage of said electric discharge that energizes said laser and step (e) of controlling the energization of said laser, controls the high voltage of the electric discharge.

15. A method as in claim 14 wherein, between steps (b) and (d) the following steps occur:
   (b1) converting said corresponding electric pulse signal to a digital number which represents the energy of the corresponding laser pulse,
   (d1) storing successive values of said digital numbers,
   (d2) computing the average digital number for a multitude of said successive digital numbers,
in step (d) said average digital number is compared with a digital number corresponding to said reference signal producing an output differential digital number, between steps (d) and (e), converting said output digital number to an equivalent analog signal and in step (e) said equivalent analog signal controls the energization of said laser.

16. A method as in claim 11 wherein, between steps (b) and (d), the following step occurs:
   (b1) computing the average value of a multitude of sequential of said electric pulse signals and
in step (d) comparing said average value with said reference signal, whereby short-term fluctuations of said laser output pulses are averaged over said multitude of laser pulses, reducing the effects of said fluctuations.

17. A method as in claim 16 wherein, between steps (b) and (d) the following steps occur:
   (b1) converting said corresponding electric pulse signal to a digital number which represents the energy of the corresponding laser pulse,
   (d1) storing successive values of said digital numbers,
   (d2) computing the average digital number for a multitude of said successive digital numbers,
in step (d) the average digital number is compared with a digital number corresponding to the reference signal producing an output differential digital number, between steps (d) and (e), converting said output digital number to an equivalent analog signal and in step (e) said equivalent analog signal controls the energization of said laser.

18. A method as in claim 11 wherein, between steps (a) and (b), the following additional steps occur:
   (b1) producing successive electric pulses that each correspond to one of the successive laser pulses,
   (b2) integrating each of said electric pulses producing a peak signal, the peak of which is representative of the energy of the corresponding laser pulse,
   (b3) filtering said peak signal producing a pulse of which the level of the zero slope peak is representative of the energy of the corresponding laser pulse,
   (b4) producing a voltage signal level which corresponds to the level of said zero slope peak of the last mentioned pulse, said corresponding level extending for a sufficient time that it can be read by an analog to digital converter, and
   (b5) converting said level to a digital number,
and in step (d) comparing said digital number with said reference signal.

19. A method as in claim 18 wherein, between steps (b5) and (d) the following steps occur:
   (d1) storing successive values of said digital numbers each of which represents the energy of the corresponding laser pulse,
   (d2) computing the average digital number for a multitude of said successive digital numbers,
in step (d) said average digital number is compared with a digital number corresponding to said reference signal producing an output differential digital number, between steps (d) and (e), converting said output digital number to an equivalent analog signal and in step (e) said equivalent analog signal controls the energization of the laser.

20. A method as in claim 19 wherein, between steps (b) and (d) the following steps occur:
   (b1) converting said corresponding electric pulse signal to a digital number which represents the energyof the corresponding laser pulse,
   (d1) storing successive values of said digital numbers,
   (d2) computing the average digital number for a multitude of said successive digital numbers,
in step (d) the average digital number is compared with a digital number corresponding to said reference signal producing an output differential digital number and between steps (d) and (e), converting said output digital number to an equivalent analog signal and in step (e) said equivalent analog signal controls the energization of said laser.

* * * * *